(12) United States Patent
Youngblood et al.

(10) Patent No.: US 10,999,974 B2
(45) Date of Patent: May 11, 2021

(54) PLUNGER SCRAPER FOR RECIPROCATING BALER

(71) Applicant: DEERE & COMPANY, Moline, IL (US)

(72) Inventors: Kyle R. Youngblood, Ottumwa, IA (US); Charles S. Sloan, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 179 days.

(21) Appl. No.: 16/435,959

(22) Filed: Jun. 10, 2019

(65) Prior Publication Data

US 2020/0383272 A1 Dec. 10, 2020

(51) Int. Cl.
*A01F 15/04* (2006.01)
*B30B 9/30* (2006.01)

(52) U.S. Cl.
CPC .......... *A01F 15/042* (2013.01); *B30B 9/3021* (2013.01)

(58) Field of Classification Search
CPC .......................... A01F 15/042; B30B 9/3021
See application file for complete search history.

(56) References Cited

U.S. PATENT DOCUMENTS

| | | | |
|---|---|---|---|
| 3,270,418 A | 9/1966 | Simeone et al. | |
| 4,417,510 A * | 11/1983 | Sharp | B23D 31/008 100/218 |
| 5,992,122 A * | 11/1999 | Rohrmoser | E04F 13/0837 52/698 |
| 10,051,792 B2 | 8/2018 | Demon et al. | |
| 10,398,086 B2 | 9/2019 | Tack | |
| 2010/0242749 A1 | 9/2010 | Demulder et al. | |
| 2012/0240793 A1* | 9/2012 | Dedeurwaerder | B30B 9/3021 100/3 |
| 2016/0000011 A1* | 1/2016 | Biebuyck | A01F 15/042 56/432 |
| 2016/0165804 A1* | 6/2016 | Tack | A01F 15/042 56/341 |
| 2017/0020076 A1 | 1/2017 | Dutertre | |

OTHER PUBLICATIONS

European Search Report issued in counterpart application No. 20178173.9 dated Nov. 9, 2020 (06 pages).

* cited by examiner

*Primary Examiner* — Jimmy T Nguyen

(57) ABSTRACT

A scraper assembly for a baler includes a mounting plate attached to a face of a plunger. The mounting plate includes an annular countersunk region and a concentric mounting bore. A follower plate includes an annular aperture. A scraper plate is attached to the follower plate for scraping a wall of a compression chamber. A cam insert includes a first annular projection seated within the annular aperture of the follower plate, and a second annular projection seated within the annular countersunk region of the mounting plate. The cam insert further includes a through bore extending through the second annular projection. The second annular projection and the through bore are eccentric from a center of the annular aperture and the first annular projection. A threaded fastener extends through the through bore of the cam insert and into threaded engagement with the mounting bore in the mounting plate.

20 Claims, 8 Drawing Sheets

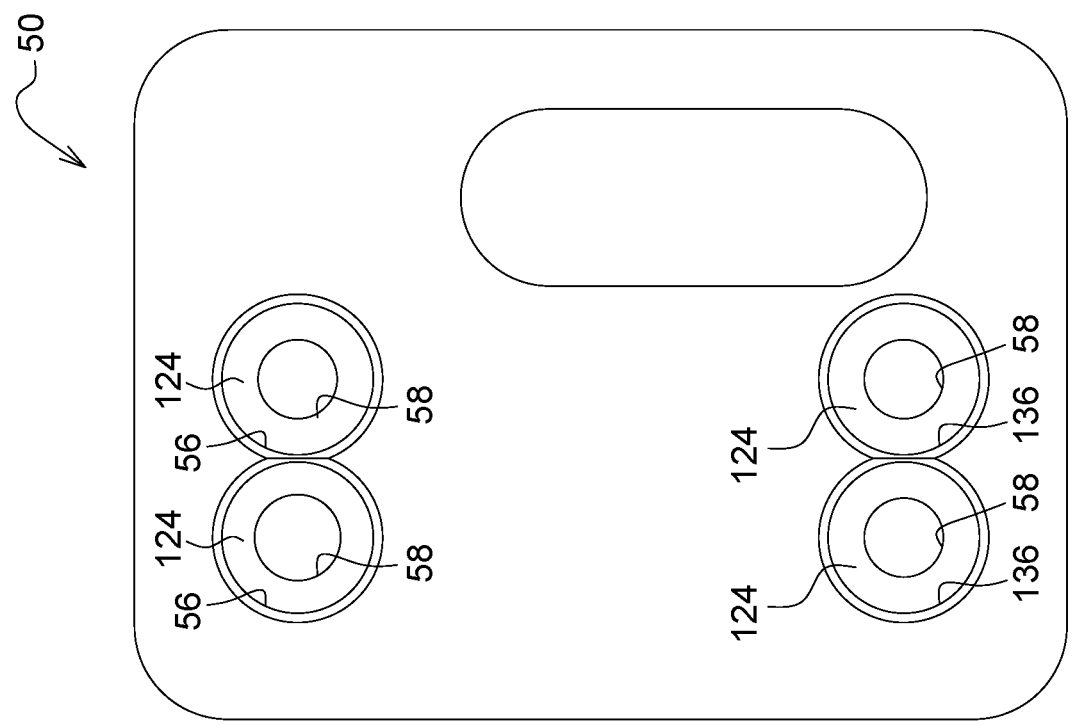
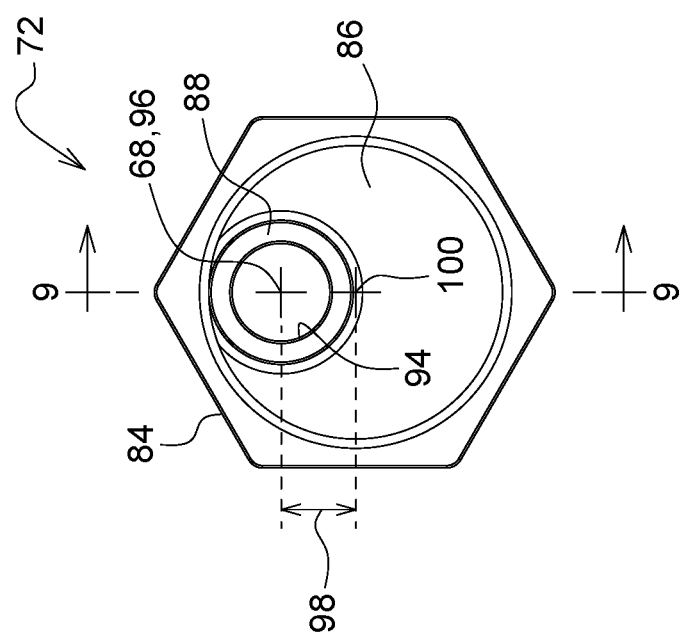

PLUNGER SCRAPER FOR RECIPROCATING BALER

TECHNICAL FIELD

The disclosure generally relates to a scraper assembly for a baler, and more specifically, to a scraper assembly for a baler having a reciprocating plunger moveable within a compression chamber.

BACKGROUND

Agricultural balers gather, compress, and shape crop material into a bale. There are different types of balers which create rectangular or square bales, or cylindrical or round bales. One exemplary baler is often referred to as a large square baler. Large square balers have been used in crop harvesting for many years, and utilize a compression system including a gearbox with a crank arm and connecting rod which are attached to a reciprocating plunger. During each rotation of the crank arm, the reciprocating plunger compresses the crop in a baling or compression chamber as the plunger moves towards the rear of the baler.

When the plunger compresses the crop material in the compression chamber, the crop material may extrude past a face of the reciprocating plunger, between a side of the reciprocating plunger and the walls of the compression chamber. Scraping assemblies may be attached to the face of the reciprocating plunger to prevent or limit crop material from extruding past the face of the reciprocating plunger and becoming lodged between the walls of the compression chamber and the reciprocating plunger.

SUMMARY

A scraper assembly for a baler having a reciprocating plunger moveable within a compression chamber is provided. The scraper assembly includes a mounting plate that is configured for attachment to a face of the plunger. The mounting plate includes an annular countersunk region. A follower plate includes an annular aperture. A scraper plate is attached to the follower plate. The scraper plate is configured for scraping a wall of the compression chamber. A cam insert includes an eccentric connection interconnecting the annular aperture of the follower plate and the annular countersunk region of the mounting plate. Rotation of the cam insert moves the follower plate relative to the mounting plate for adjusting the follower plate relative to a wall of the compression chamber.

In one aspect of the disclosure, the cam insert includes a first annular projection seated within the annular aperture of the follower plate, and a second annular projection seated within the annular countersunk region of the mounting plate. The cam insert further includes a through bore extending through the second annular projection. A fastener extends through the through bore of the cam insert. The fastener is disposed in interlocking engagement with the mounting plate for securing the follower plate relative to the mounting plate.

In one aspect of the disclosure, the second annular projection and the through bore are eccentrically located relative to the first annular projection.

In one aspect of the disclosure, the mounting plate includes a mounting bore concentric with the annular countersunk region. In one embodiment, the mounting bore includes internal threads and the fastener includes external threads in threaded engagement with the internal threads of the mounting bore.

In one aspect of the disclosure, the through bore includes an internal diameter, and the fastener includes a shank portion having a shank diameter. The internal diameter of the through bore is larger than the shank diameter to limit shear transfer between the cam insert and the shank portion of the fastener.

In one aspect of the disclosure, the follower plate and the scraper plate are arranged substantially perpendicular relative to each other. The follower plate and the scraper plate may be integrally formed together from a single structure, or may be permanently attached together, such as by welding or some other similar process.

In one aspect of the disclosure, the annular aperture includes an aperture diameter, and the first annular projection includes a first projection diameter. The aperture diameter is larger than the first projection diameter to enable relative movement between the first annular projection and the annular aperture, in a direction perpendicular to a central axis of the annular countersunk region. In one embodiment, the aperture diameter is between 0.1 mm and 1.0 mm larger than the first projection diameter.

In one aspect of the disclosure, the annular countersunk region includes a countersunk diameter, and the second projection includes a second projection diameter. The countersunk diameter is larger than the second projection diameter to enable relative movement between the second annular projection and the annular countersunk region, in a direction perpendicular to a central axis of the annular countersunk region. In one embodiment, the countersunk diameter is between 0.1 mm and 1.0 mm larger than the second projection diameter.

In one aspect of the disclosure, the cam insert includes a base portion having an inner surface disposed against an exterior surface of the follower plate. The first projection extends away from the inner surface a first distance, and the second projection extends away from the inner surface a second distance. The second distance is greater than the first distance.

In one aspect of the disclosure, the base portion includes an exterior edge forming a cross sectional shape perpendicular to the central axis of the annular countersunk region. The cross-sectional shape of the base portion includes a base area, and the annular aperture includes an aperture area. The base area is larger than the aperture area. In one embodiment, the cross-sectional shape of the base portion is a hexagon.

In one aspect of the disclosure, the mounting plate includes a second annular countersunk region, and the follower plate includes a second annular aperture. The scraper assembly further includes a second cam insert. The second cam insert includes a first annular projection seated within the second annular aperture of the follower plate, and a second annular projection seated within the second annular countersunk region of the mounting plate. The second cam insert further includes a through bore extending through the second annular projection of the second cam insert. A second fastener extends through the through bore of the second cam insert, and is disposed in interlocking engagement with the mounting plate for securing the follower plate relative to the mounting plate.

Accordingly, the interaction between the cam inserts and the follower plate and the tolerances therebetween, and particularly the eccentric rotation of the second projection about a center of the first projection, enable the follower plate to be moved both laterally and angularly relative to a wall of the compression chamber to provide the adjustability and range of motion for positioning the scraper plate against the wall of the compression chamber. The fasteners provide a clamping force, which clamps the base portion of the cam insert against the follower plate. The base portion of the cam insert provides a large clamping surface for engaging the follower plate for a secure connection. Additionally, due to the tolerances between the through bore and the fastener, lateral shear forces are transmitted from the follower plate to the first projection of the cam insert, and thereby to the mounting plate via the second projection, such that the fastener is not subjected to shear forces.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 8 is a schematic plan view of the cam insert.

FIG. 10 is a schematic plan view of a mounting plate of the scraper assembly.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
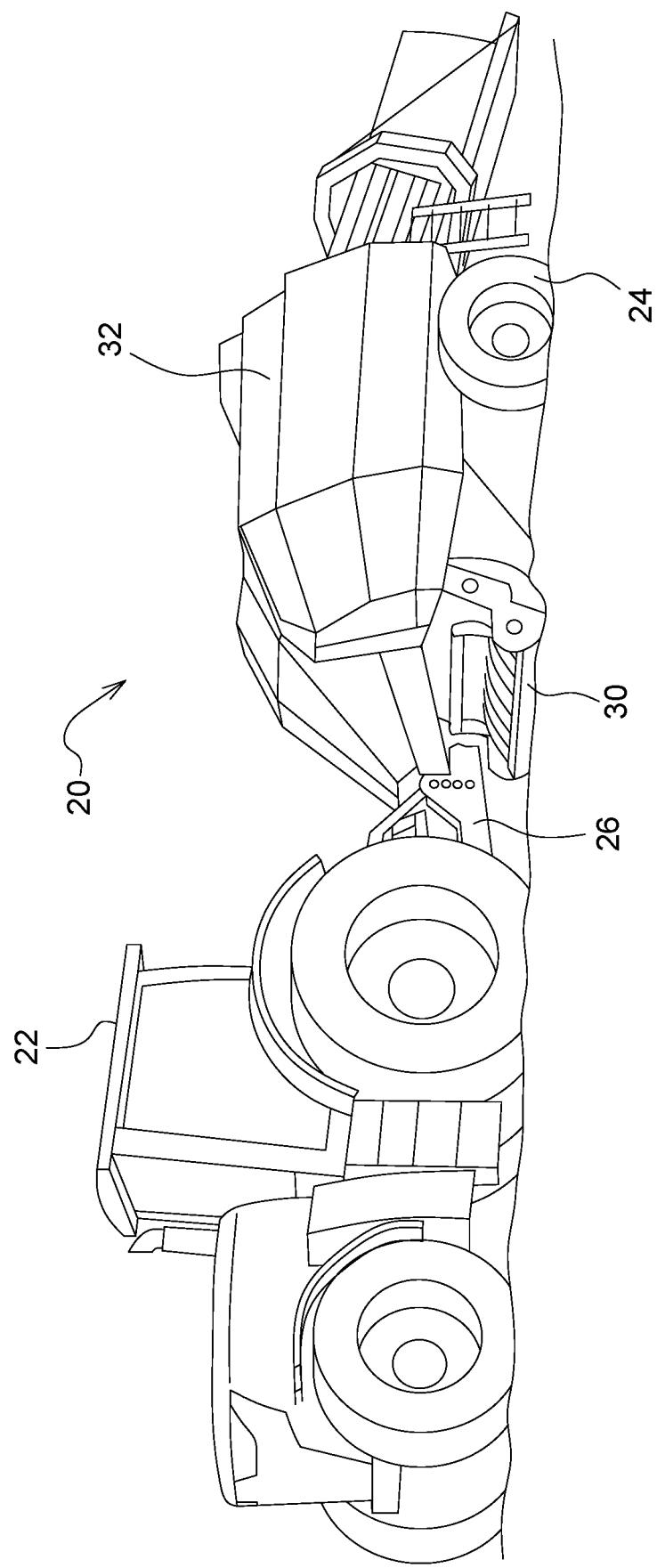
FIG. 1 is a schematic perspective view of a baler drawn by a tractor.
Figure 2:
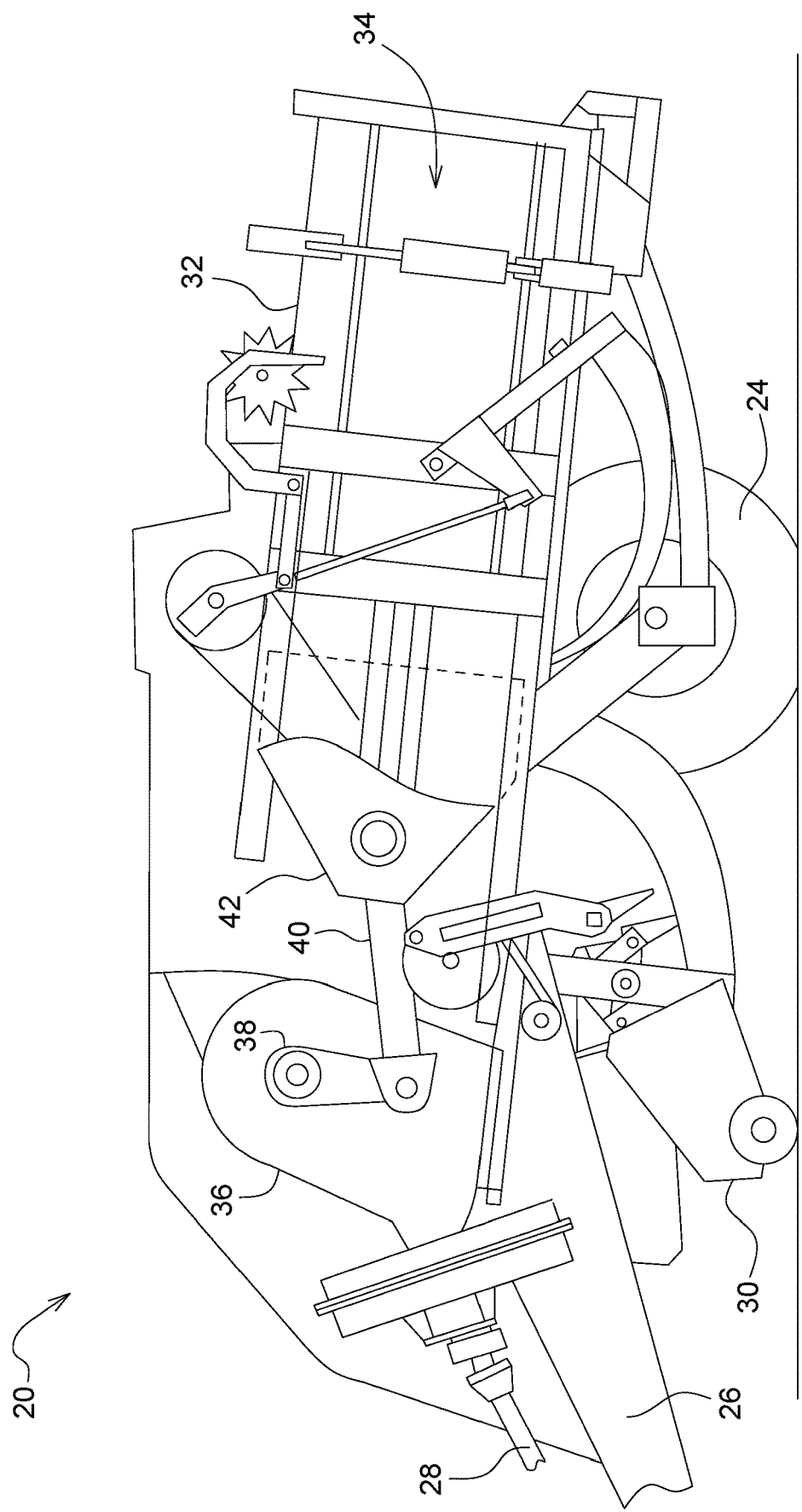
FIG. 2 is a schematic side view of the baler.

Referring to the Figures, wherein like numerals indicate like parts throughout the several views, a baler is generally shown at 20 in FIGS. 1 and 2. Referring to FIGS. 1 and 2 the baler 20 is shown as a large square baler 20. However, it should be appreciated that the teachings of this disclosure may be applied to other baler 20 platforms, and are not limited to the exemplary embodiment of the large square baler 20 shown in the Figures and described herein.

As shown in FIG. 1, a vehicle, such as but not limited to a tractor 22, is coupled to the baler 20 for pulling and powering the baler 20. However, it should be appreciated that in other embodiments the baler 20 may be self-propelled. As depicted in FIG. 1, the baler 20 may move across a field and gather and process crop material to form a bale. The baler 20 may then eject the formed bale from the rear of the baler 20.

Referring to FIG. 2, the exemplary embodiment of the baler 20 includes a frame, ground engaging devices, such as but not limited to wheels 24, a hitch 26 for attachment to the tractor 22 or other vehicle, and an input shaft 28, such as a power-take-off (PTO) shaft, which can receive rotational power from a power source, such as the tractor 22. The baler 20 includes a pick-up mechanism 30 which gathers crop material from the ground surface and feeds it into the baler 20. The pick-up mechanism 30 may include various pick-up apparatus including, but not limited to, tines, forks, augers, conveyors, baffles, a cutter or pre-cutter assembly, or any combination of the preceding. The baler 20 includes a housing or body 32, which generally shields various internal components of the baler 20. The body 32 includes multiple wall 48 sections that form a compression chamber 34 (shown in FIG. 2) used for forming the bale.

The input shaft 28 or PTO shaft is connected to an input of a transmission 36 to provide rotational power to the baler 20 from the tractor 22 or other associated vehicle or power source. The transmission 36 includes a gearbox which converts the rotational motion of the input shaft 28 along a generally longitudinal axis of the baler 20 to an output of the transmission 36 having a rotational motion along a generally transverse axis of the baler 20.

The baler 20 includes a crank arm 38 connected to the output of the transmission 36. A connecting ling 40 interconnects the crank arm 38 and a plunger 42. The crank arm 38 rotates based upon the output of the transmission 36 and the plunger 42 moves in a reciprocal motion within the compression chamber 34 as the crank arm 38 rotates. The plunger 42 extends into the compression chamber 34, thereby compressing the crop material, and then at least partially retracts from the compression chamber 34 to allow more crop material to enter the compression chamber 34.

Figure 3:
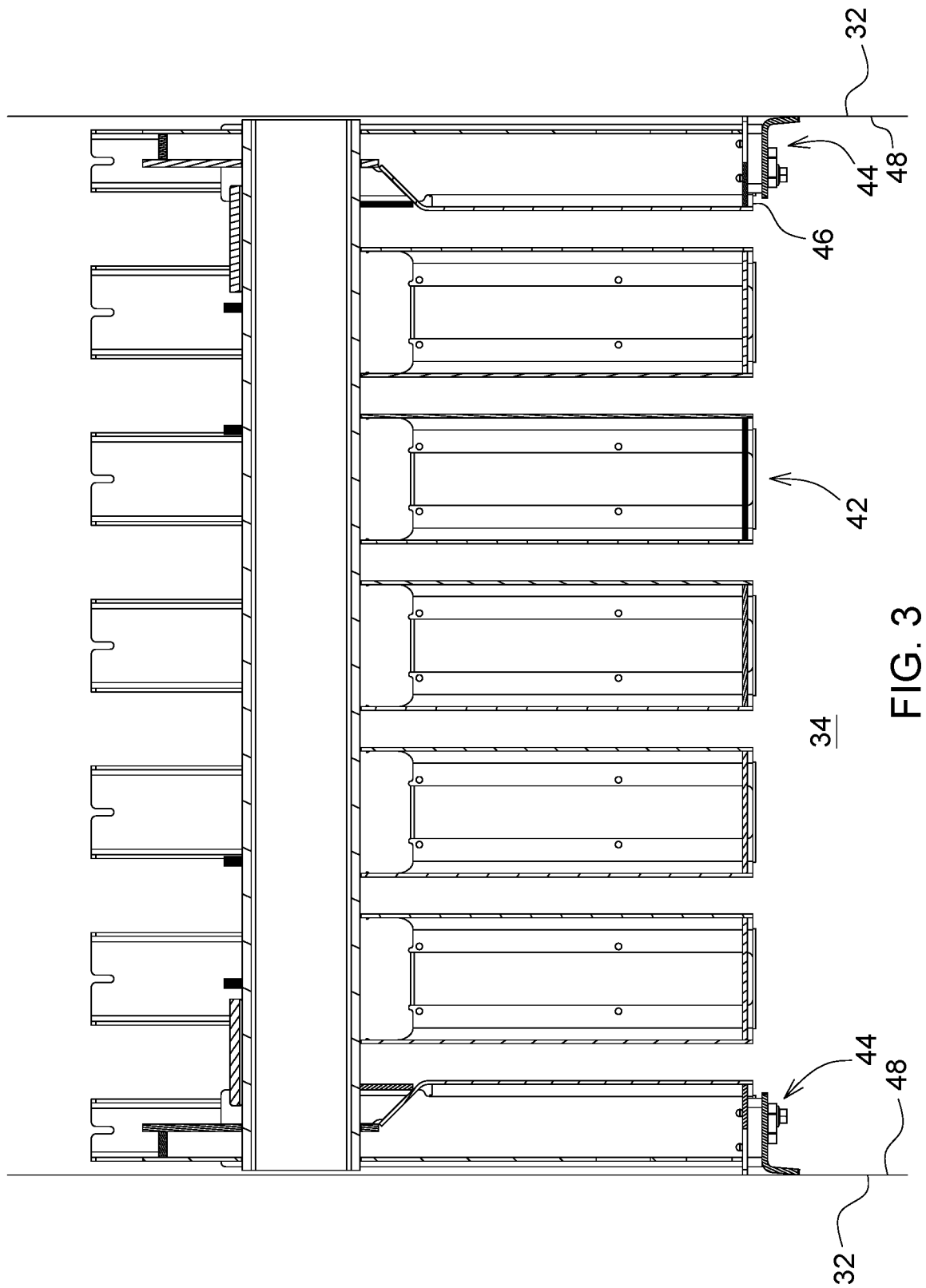
FIG. 3 is a schematic plan view of a reciprocating plunger within a compression chamber of the baler.

Referring to FIG. 3, the baler 20 further includes a scraper assembly 44. The scraper assembly 44 is attached to a forward face 46 of the plunger 42, and is operable to scrape along the walls 48 of the body 32 forming the compression chamber 34 to prevent or limit crop material from extruding past the face 46 of the plunger 42, and becoming lodged between the plunger 42 and the walls 48 of the body 32 forming the compression chamber 34.

Figure 4:
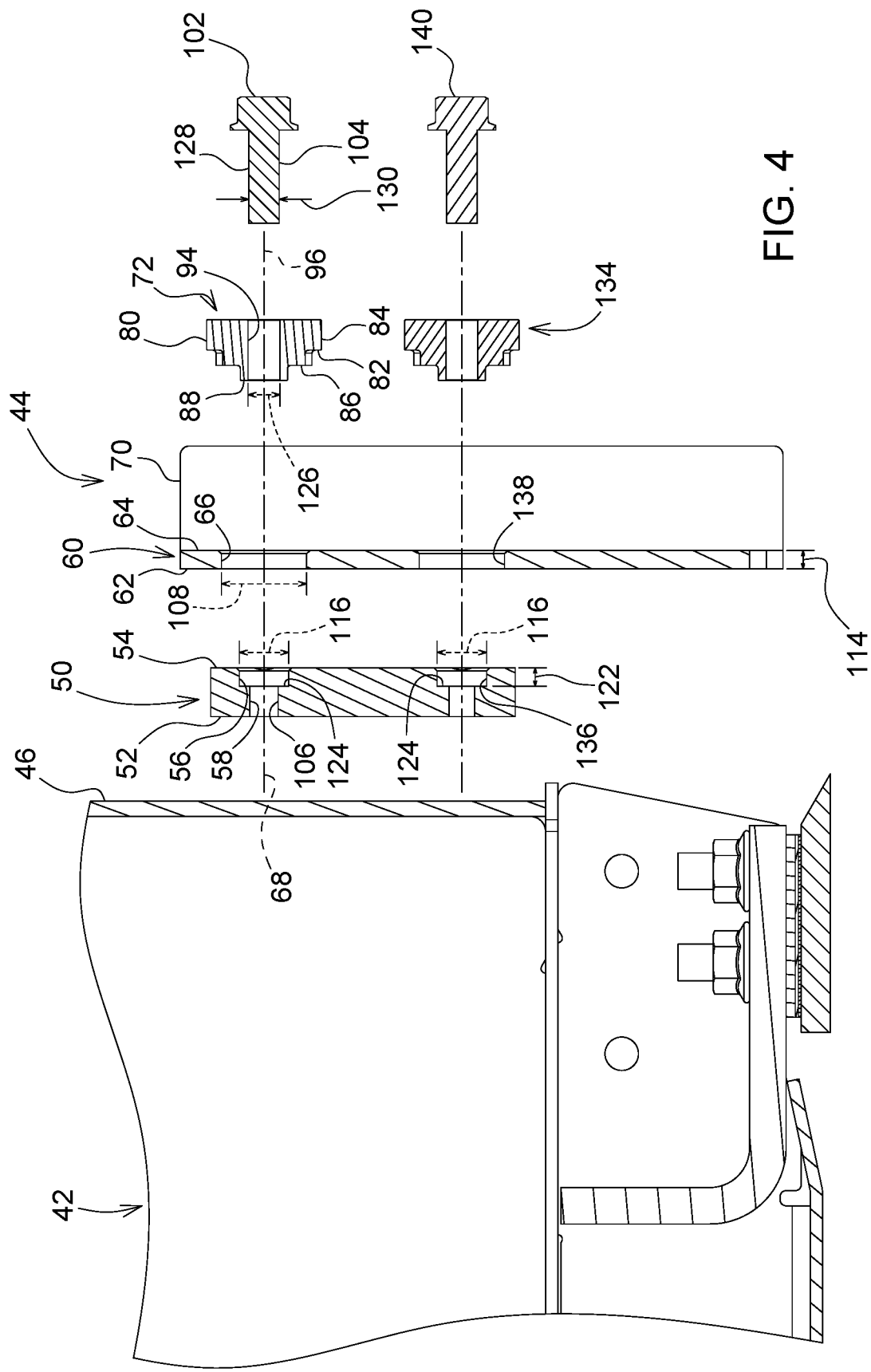
FIG. 4 is a schematic exploded side cross-sectional view of a scraper assembly.
Figure 5:
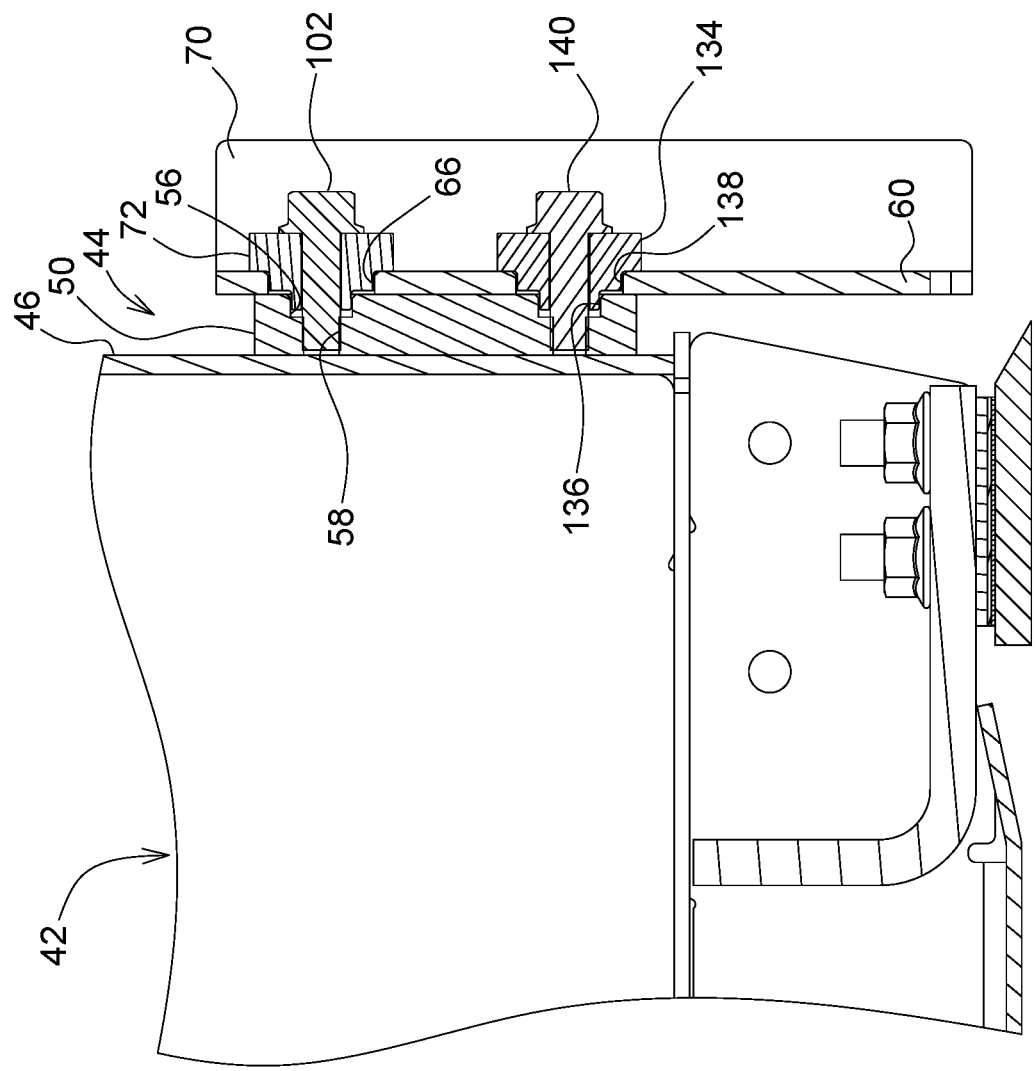
FIG. 5 is a schematic side cross-sectional view of the scraper assembly.
Figure 7:
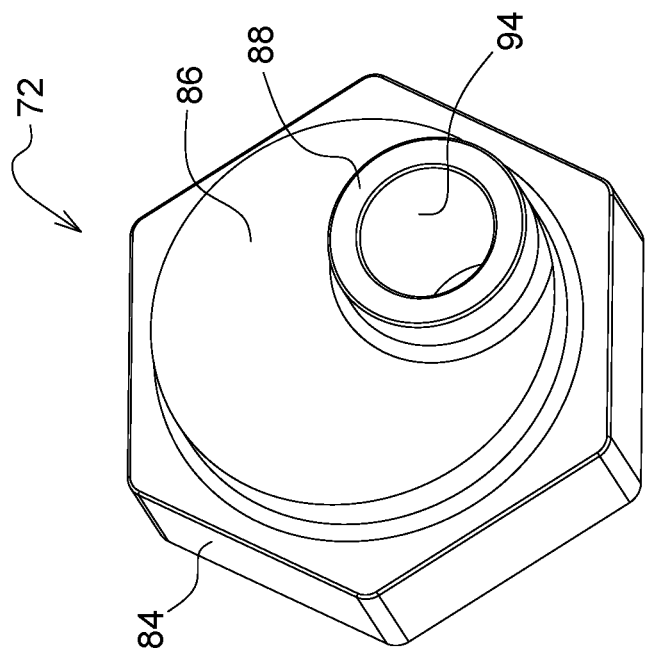
FIG. 7 is a schematic perspective view of a cam insert of the scraper assembly.
Figure 6:
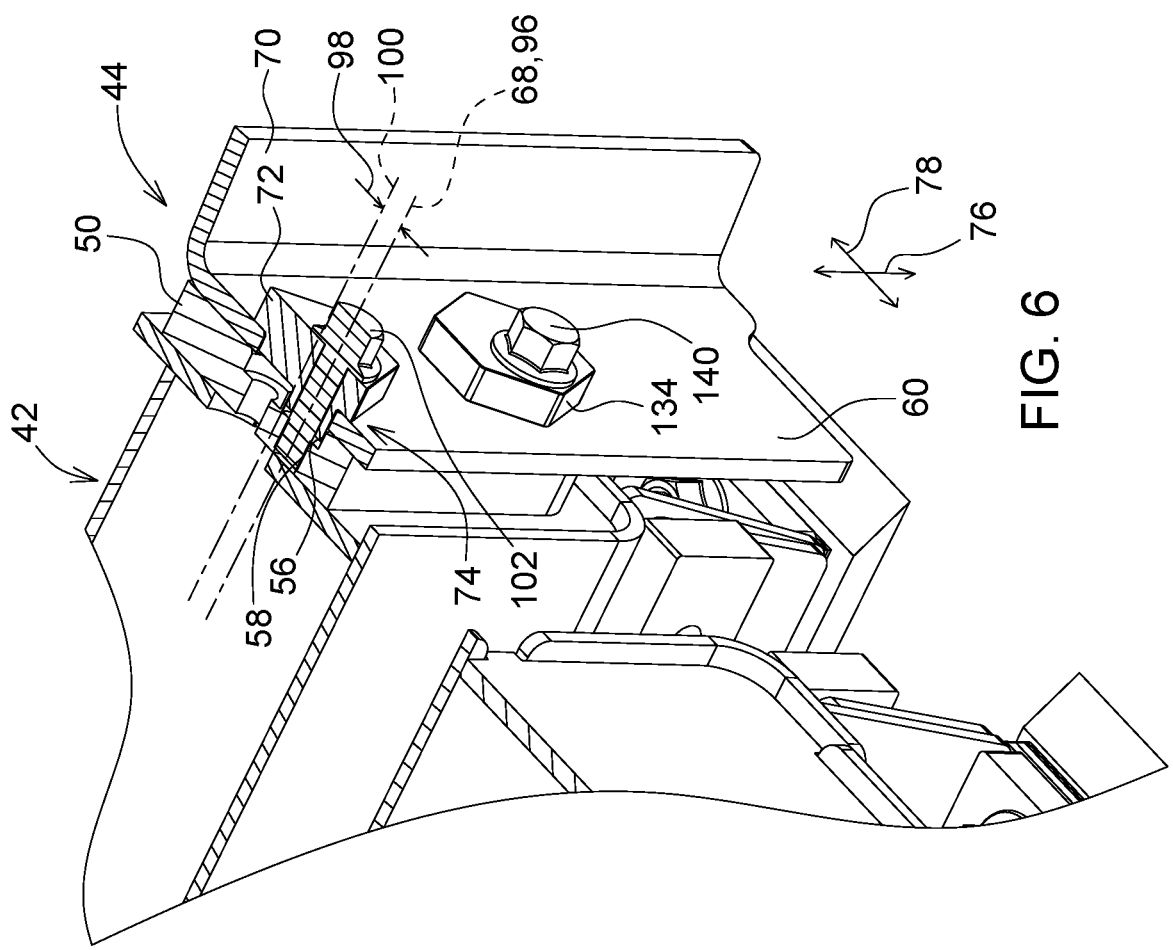
FIG. 6 is a schematic perspective cross-sectional view of the scraper assembly.
Figure 9:
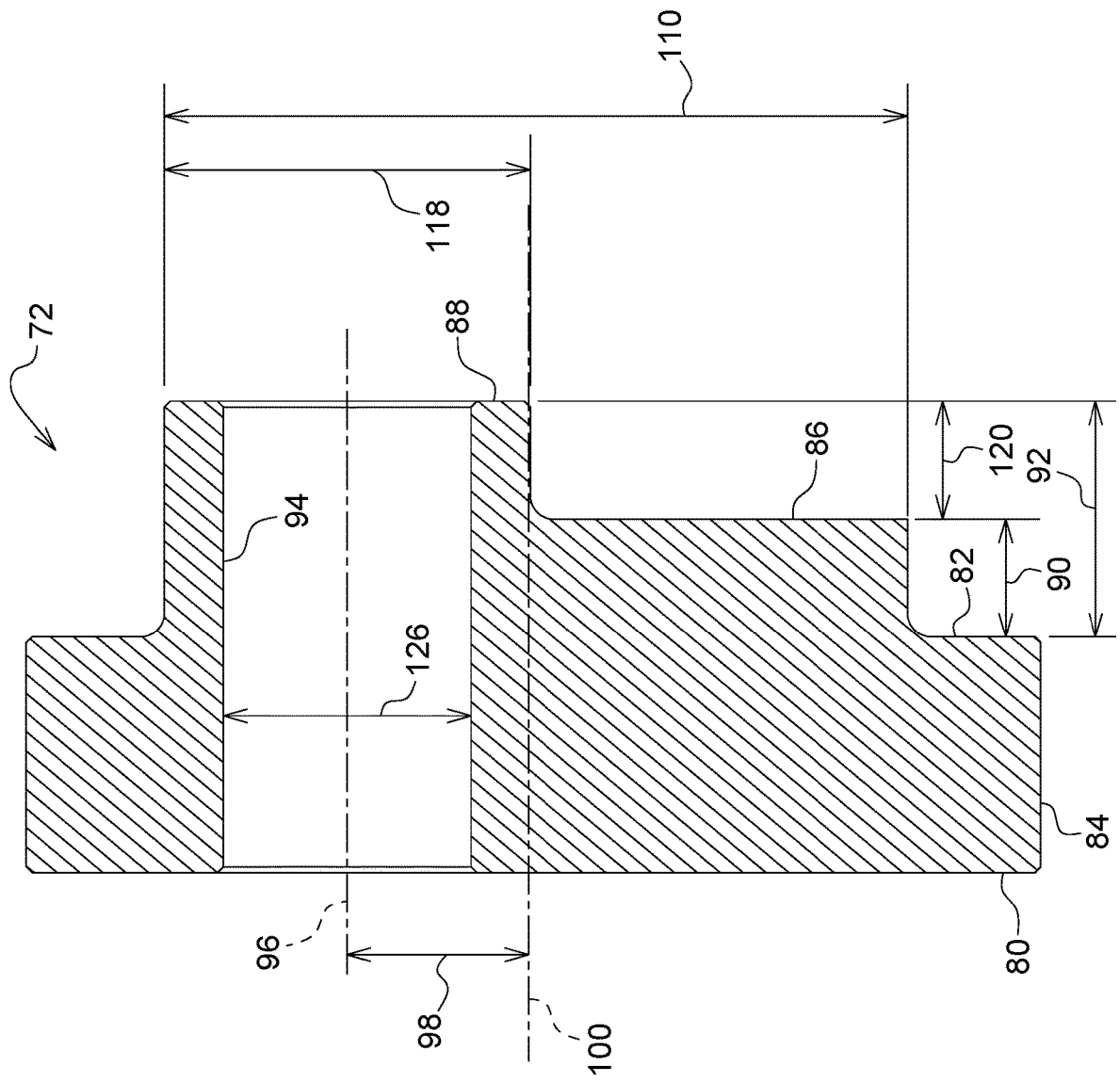
FIG. 9 is a schematic cross sectional view of the cam insert.

Referring to FIGS. 4-6, the scraper assembly 44 includes a mounting plate 50 that is configured for attachment to the face 46 of the plunger 42. The mounting plate 50 may be attached to the face 46 of the plunger 42 in a suitable manner that securely affixes the mounting plate 50 to the plunger 42. For example, the mounting plate 50 may be bolted to the face 46 of the plunger 42, welded to the face 46 of the plunger 42, or attached to the face 46 of the plunger 42 using some other form of fastener or connector not described herein. In other embodiments, it is contemplated that the mounting plate 50 may be integrally formed with and/or defined by the face 46 of the plunger 42.

As best shown in FIG. 6, the mounting plate 50 includes a first surface 52 disposed adjacent to and in abutting engagement with the face 46 of the plunger 42. The mounting plate 50 includes a second surface 54 that is disposed opposite the first surface 52 of the mounting plate 50, and faces away from the face 46 of the plunger 42. The mounting plate 50 includes an annular countersunk region 56 formed into the second surface 54 of the mounting plate 50. A mounting bore 58 extends into the mounting plate 50, and is substantially concentric with the annular countersunk region 56. The mounting bore 58 may extend completely through the mounting plate 50, or may be a blind bore that does not extend completely through the mounting plate 50.

Referring to FIGS. 4-6, the scraper assembly 44 further includes a follower plate 60. As best shown in FIG. 6, the follower plate 60 includes a first surface 62 disposed adjacent to and in abutting engagement with the second surface 54 of the mounting plate 50. The follower plate 60 includes a second or exterior surface 64 that is disposed opposite the first surface 62 of the follower plate 60, and faces away from the face 46 of the plunger 42. The follower plate 60 includes an annular aperture 66 that extends between the first surface 62 and the second surface 54 of the follower plate 60. The annular aperture 66 includes or defines an aperture area perpendicular to a central axis 68 of the annular countersunk region 56.

Referring to FIGS. 4-6, a scraper plate 70 may be attached to the follower plate 60. In the exemplary embodiment of the scraper assembly 44 shown in the Figures and described herein, the scraper plate 70 is arranged substantially perpendicular relative to the follower plate 60 to form an approximate right angle therebetween. However, it should be appreciated that the scraper plate 70 may alternatively be arranged relative to the follower plate 60 to form a non-right angle therebetween. The scraper plate 70 is shaped and arranged for scraping the wall 48 of the compression chamber 34. While the exemplary embodiment of the scraper assembly 44 is shown including the scraper plate 70, it should be appreciated that a lateral edge of the follower plate 60 may be used to scrape the wall 48 of the compression chamber 34, such that the scraper assembly 44 does not include the scraper plate 70 shown in the exemplary embodiment.

Referring to FIGS. 4-9, the scraper assembly 44 further includes a cam insert 72. The cam insert 72 includes an eccentric connection 74 interconnecting the annular aperture 66 of the follower plate 60 and the annular countersunk region 56 of the mounting plate 50. Because of the eccentric connection 74, rotation of the cam insert 72 moves the follower plate 60 relative to the mounting plate 50. It should be appreciated that the rotation of the cam insert 72 moves the follower plate 60 in two dimensions, e.g., a vertical dimension, indicated by arrow 76, and a lateral dimension, indicated by arrow 78, relative to the face 46 of the plunger 42.

The cam insert 72 includes a base portion 80 having an inner surface 82 disposed against the second or exterior surface 64 of the follower plate 60. An exterior edge 84 of the base portion 80 forms a cross sectional shape perpendicular to the central axis 68 of the annular countersunk region 56. The cross-sectional shape of the base portion 80 includes or defines a base area. The base area is larger than the aperture area, such that the base portion 80 provides a significant surface contact area in abutting contact with the second or exterior surface 64 of the follower plate 60 for communicating a clamping force therebetween. In the exemplary embodiment shown in the Figures and described herein, the cross-sectional shape of the base portion 80 is a hexagon. However, it should be appreciated that the cross-sectional shape of the base portion 80 may include some other shape. Preferably, however, the cross-sectional shape of the base portion 80 provides a convenient shape for engaging a tool for rotating the base portion 80, such as the exemplary hexagonal shape shown in the Figures.

The cam insert 72 further includes a first annular projection 86 and a second annular projection 88. The first annular projection 86 of the cam insert 72 is seated within the annular aperture 66 of the follower plate 60. The first annular projection 86 is substantially concentric with the base portion 80 of the of the cam insert 72. The second annular projection 88 of the cam insert 72 is seated within the annular countersunk region 56 of the mounting plate 50. The second annular projection 88 of the cam insert 72 is eccentrically located relative to the first annual projection and the base portion 80.

The first projection extends away from the inner surface 82 of the base portion 80 a first distance 90. The second projection extends away from the inner surface 82 of the base portion 80 a second distance 92. The second distance 92 is greater than the first distance 90 such that the second projection extends farther away from the inner surface 82 of the base portion 80 than the first projection.

The cam insert 72 further includes a through bore 94 that extends through the base portion 80 and the second annular projection 88. The through bore 94 is substantially concentric with the second annular projection 88. The second annular projection 88 and the through bore 94 are eccentric relative to the first annular projection 86 and the base portion 80. In other words, a central axis 96 of the through bore 94 and the second annular projection 88 is laterally offset an offset distance 98 relative to a central axis 100 of the first annular projection 86 and the base portion 80. Additionally, the central axis 96 of the through bore 94 and the second annular projection 88 is substantially coaxially located with the central axis 68 of the annular countersunk region 56.

A fastener 102 extends through the through bore 94 of the cam insert 72, and is disposed in interlocking engagement with the mounting plate 50. The fastener 102 provides a clamping force to the base portion 80 of the cam insert 72, which in turn clamps the follower plate 60 to the mounting plate 50 to secure the follower plate 60 relative to the mounting plate 50. In the exemplary embodiment shown in the Figures and described herein, the fastener 102 includes external threads 104, and the mounting bore 58 includes internal threads 106 for threaded engagement with the external threads 104 of the fastener 102. Accordingly, the fastener 102 is disposed in threaded engagement with the mounting bore 58. It should be appreciated that the scraper assembly 44 may use some other fastening mechanism or system, other than the threaded engagement between the fastener 102 and the mounting bore 58, to interconnect the fastener 102 and the mounting plate 50, and that the scope of the disclosure is not limited to the exemplary embodiment described herein.

The annular aperture 66 includes an aperture diameter 108. The first annular projection 86 includes a first projection diameter 110. The aperture diameter 108 is larger than the first projection diameter 110 to enable relative movement between the first annular projection 86 and the annular aperture 66, in a direction perpendicular to the central axis 68 of the annular countersunk region 56. For example, the aperture diameter 108 may be between 0.1 mm and 1.0 mm larger than the first projection diameter 110. In the exemplary embodiment shown in the Figures and described herein, the aperture diameter 108 is between 0.350 mm and 0.425 mm larger than the first projection diameter 110.

The first annular projection 86 of the cam insert 72 includes a first projection thickness relative to the inner surface 82 of the base portion 80. In the exemplary embodiment, the first projection thickness is equal to the first distance 90. The follower plate 60 includes a plate thickness 114 parallel with the central axis 68 of the annular countersunk region 56. The first projection thickness of the first annular projection 86 is less than the plate thickness 114 of the follower plate 60, such that the first annular projection 86 does not extend past the first surface 62 of the follower plate 60, so that the base portion 80 of the cam insert 72 is free to exert a clamp force against the follower plate 60 to clamp the follower plate 60 to the mounting plate 50. A difference between the first projection thickness i.e., the first distance 90, and the plate thickness 114 of the follower plate 60 may be between the range of 1.0 mm and 2.0 mm.

The annular countersunk region 56 includes a countersunk diameter 116. The second annular projection 88 includes a second projection diameter 118. The countersunk diameter 116 is larger than the second projection diameter 118 to enable relative movement between the second annular projection 88 and the annular countersunk region 56, in a direction perpendicular to the central axis 68 of the annular countersunk region 56. For example, the countersunk diameter 116 may be between 0.1 mm and 1.0 mm larger than the second projection diameter 118. In the exemplary embodiment shown in the Figures and described herein, the countersunk diameter 116 is between 0.350 mm and 0.425 mm larger than the second projection diameter 118.

The second annular projection 88 of the cam insert 72 extends away from the first annular projection 86 of the cam insert 72 to define a second projection thickness 120. The annular countersunk region 56 is recessed a depth 122 from the second surface 54 of the mounting plate 50. The second projection thickness 120 is less than the depth 122 of the countersunk region, such that the second annular projection 88 does not bottom out or contact a bottom surface 124 of the annular countersunk region 56, so that the base portion 80 of the cam insert 72 is free to exert a clamp force against the follower plate 60 to clamp the follower plate 60 to the mounting plate 50. A difference between the second projection thickness 120 of the second annular projection 88 and the depth 122 of the countersunk region may be between the range of 1.0 mm and 2.0 mm.

The through bore 94 includes an internal diameter 126. The fastener 102 includes a shank portion 128 having a shank diameter 130. The internal diameter 126 of the through bore 94 is larger than the shank diameter 130 of the fastener 102 to limit shear force transfer between the cam insert 72 and the shank portion 128 of the fastener 102. By sizing the internal diameter 126 of the through bore 94 to be larger than the shank diameter 130 of the fastener 102, interaction between the annular aperture 66 of the follower plate 60 and the first annular projection 86 of the cam insert 72 communicates shear forces imparted by the follower plate 60 to the cam insert 72, such that interaction between the second annular projection 88 and the annular countersunk region 56 may transfer the shear forces to the mounting plate 50. As such, the fastener 102 is operable to provide a clamping force to secure the follower plate 60 to the mounting plate 50, and does not have to transfer any or significant shear forces therebetween. In one embodiment, the difference between the internal diameter 126 of the through bore 94 and the shank diameter 130 of the fastener 102 is greater than the difference between the aperture diameter 108 and the first projection diameter 110.

In operation, the fastener 102 is tightened to provide the clamping force to the cam insert 72. The base portion 80 of the cam insert 72 is thereby pressed against the second or exterior surface 64 of the follower plate 60, and clamps the follower plate 60 to the mounting plate 50. In order to adjust the position of the follower plate 60 relative to the mounting plate 50, the fastener 102 is loosened, and the base portion 80 of the cam insert 72 is rotated. Because of the interaction and/or engagement between the second annular projection 88 and the annular counter sunk region, the cam insert 72 rotates about the central axis 68 of the annular countersunk region 56. Because the second annular projection 88 is eccentric relative to the first annular projection 86, the first annular projection 86 and the base portion 80 swing along an accurate path 132, moving the first annular projection 86 and the base portion 80 of the cam insert 72 in two dimensions, e.g., the vertical dimension 76 and the lateral dimension 78 relative to the face 46 of the plunger 42. Because of the interaction and/or engagement between the first annular projection 86 and the annular aperture 66 of the follower plate 60, the follower plate 60 follows the movement of the cam insert 72 as the cam insert 72 is rotated, thereby moving the follower plate 60 with the cam insert 72.

Referring to FIGS. 4-6, the mounting plate 50 may further include a second cam insert 134. The features and operation of the second cam insert 134 is identical to the first cam insert 72 described above. Accordingly, the second cam insert 134 is not described in detail herein. However, briefly described, the mounting plate 50 includes a second annular countersunk region 136, and the follower plate 60 includes a second annular aperture 138. The second cam insert 134 includes a first annular projection 86 seated within the second annular aperture 138 of the follower plate 60, and a second annular projection 88 seated within the second annular countersunk region 136 of the mounting plate 50. A through bore 94 extends through the second annular projection 88 of the second cam insert 134. A second fastener 140 extends through the through bore 94 of the second cam insert 134, and is disposed in interlocking engagement with the mounting plate 50 for securing the follower plate 60 relative to the mounting plate 50.

Because of the tolerances between the annular aperture 66 and the first annular projection 86 of the first cam insert 72, and between the second annular aperture 138 and the first annular projection 86 of the second cam insert 134, and the tolerances between the annular countersunk region 56 and the second annular projection 88 of the first cam insert 72, and between the second annular countersunk region 136 and the second annular projection 88 of the second cam insert 134, a position of the follower plate 60, and thereby the scraper plate 70, may be adjusted to provide an angular adjustment of the follower plate 60 to match the position of the wall 48 of the compression chamber 34. In other words, the first cam insert 72 and the second cam insert 134 may rotated to a different angular degree or position, thereby providing an angular adjustment to the follower plate 60 relative to the wall 48 of the compression chamber 34.

Additionally, referring to FIG. 10, the mounting plate 50 may include multiple pairs of the first annular countersunk region 56 and the second annular countersunk region 136, thereby providing two different mounting positions for the follower plate 60 relative to the mounting plate 50.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A scraper assembly for a baler having a reciprocating plunger moveable within a compression chamber, the scraper assembly comprising:

a mounting plate configured for attachment to a face of the plunger, wherein the mounting plate includes an annular countersunk region;

a follower plate having an annular aperture;

a scraper plate attached to the follower plate;

a cam insert including an eccentric connection interconnecting the annular aperture of the follower plate and the annular countersunk region of the mounting plate, such that rotation of the cam insert moves the follower plate relative to the mounting plate.

2. The scraper assembly set forth in claim 1, wherein the cam insert includes:

a first annular projection seated within the annular aperture of the follower plate;

a second annular projection seated within the annular countersunk region of the mounting plate;

a through bore extending through the second annular projection; and a fastener extending through the through bore of the cam insert and disposed in interlocking engagement with the mounting plate for securing the follower plate relative to the mounting plate.

3. The scraper assembly set forth in claim 2, wherein the second annular projection and the through bore are eccentric relative to the first annular projection.

4. The scraper assembly set forth in claim 2, wherein the mounting plate includes a mounting bore concentric with the annular countersunk region.

5. The scraper assembly set forth in claim 3, wherein the fastener includes external threads, and wherein the mounting bore includes internal threads for threaded engagement with the external threads of the fastener.

6. The scraper assembly set forth in claim 1, wherein the follower plate arranged perpendicular to the scraper plate.

7. The scraper assembly set forth in claim 2, wherein the annular aperture includes an aperture diameter, the first annular projection includes a first projection diameter, and wherein the aperture diameter is larger than the first projection diameter to enable relative movement between the first annular projection and the annular aperture in a direction perpendicular to a central axis of the annular countersunk region.

8. The scraper assembly set forth in claim 7, wherein the aperture diameter is between 0.1 mm and 1.0 mm larger than the first projection diameter.

9. The scraper assembly set forth in claim 2, wherein the annular countersunk region includes a countersunk diameter, the second annular projection includes a second projection diameter, and wherein the countersunk diameter is larger than the second projection diameter to enable relative movement between the second annular projection and the annular countersunk region in a direction perpendicular to a central axis of the annular countersunk region.

10. The scraper assembly set forth in claim 9, wherein the countersunk diameter is between 0.1 mm and 1.0 mm larger than the second projection diameter.

11. The scraper assembly set forth in claim 2, wherein the through bore includes an internal diameter, the fastener includes a shank portion having a shank diameter, and wherein the internal diameter of the through bore is larger than the shank diameter to limit shear transfer between the cam insert and the shank portion of the fastener.

12. The scraper assembly set forth in claim 2, wherein:

the cam insert includes a base portion having an inner surface disposed against an exterior surface of the follower plate;

the first annular projection extends away from the inner surface a first distance;

the second annular projection extends away from the inner surface a second distance; and the second distance is greater than the first distance.

13. The scraper assembly set forth in claim 12, wherein the base portion includes an exterior edge forming a cross sectional shape perpendicular to a central axis of the annular countersunk region, wherein the cross-sectional shape of the base portion includes a base area, wherein the annular aperture includes an aperture area, and wherein the base area is larger than the aperture area.

14. The scraper assembly set forth in claim 13, wherein the cross-sectional shape of the base portion is a hexagon.

15. The scraper assembly set forth in claim 2, further comprising:

wherein the mounting plate includes a second annular countersunk region;

wherein the follower plate includes a second annular aperture;

a second cam insert including:

a first annular projection seated within the second annular aperture of the follower plate;

a second annular projection seated within the second annular countersunk region of the mounting plate;

a through bore extending through the second annular projection of the second cam insert; and a second fastener extending through the through bore of the second cam insert and disposed in interlocking engagement with the mounting plate for securing the follower plate relative to the mounting plate.

16. A scraper assembly for a baler having a reciprocating plunger moveable within a compression chamber, the scraper assembly comprising:

a mounting plate configured for attachment to a face of the reciprocating plunger, wherein the mounting plate includes a first annular countersunk region and a second annular countersunk region;

a follower plate having a first annular aperture and a second annular aperture;

a scraper plate attached to the follower plate;

a first cam insert including:

a first annular projection seated within the first annular aperture of the follower plate;

a second annular projection seated within the first annular countersunk region of the mounting plate;

a through bore extending through the second annular projection of the first cam insert;

a fastener extending through the through bore of the first cam insert and disposed in interlocking engagement with the mounting plate for clamping the follower plate relative to the mounting plate; and a second cam insert including:

a first annular projection seated within the second annular aperture of the follower plate;

a second annular projection seated within the second annular countersunk region of the mounting plate;

a through bore extending through the second annular projection of the second cam insert;

a fastener extending through the through bore of the second cam insert and disposed in interlocking engagement with the mounting plate for clamping the follower plate relative to the mounting plate.

17. The scraper assembly set forth in claim 16, wherein the second annular projection and the through bore of each of the first cam insert and the second cam insert are eccentric relative to the first annular projection of the first cam insert and the second cam insert respectively.

18. The scraper assembly set forth in claim 16, wherein the mounting plate includes a first mounting bore concentric with the first annular countersunk region and disposed in threaded engagement with the fastener of the first cam insert, and a second mounting bore concentric with the second annular countersunk region and disposed in threaded engagement with the fastener of the second cam insert.

19. A baler comprising:
 a body forming a compression chamber;
 a reciprocating plunger moveable within the compression chamber;
 a scraper assembly including:
  a mounting plate attached to a face of the reciprocating plunger, wherein the mounting plate includes an annular countersunk region;
  a follower plate having an annular aperture;
  a scraper plate attached to the follower plate;
  a cam insert including a first annular projection seated within the annular aperture of the follower plate, a second annular projection seated within the annular countersunk region of the mounting plate, and a through bore extending through the second annular projection; and
  a fastener extending through the through bore of the cam insert and disposed in interlocking engagement with the mounting plate for securing the follower plate relative to the mounting plate.

20. The baler set forth in claim 19, wherein the second annular projection and the through bore are eccentric relative to the first annular projection.

\* \* \* \* \*